(12) United States Patent
MacInnis

(10) Patent No.: US 9,542,466 B2
(45) Date of Patent: Jan. 10, 2017

(54) SYSTEMS AND METHODS FOR DISTRIBUTED STORAGE

(71) Applicant: AetherStore LLC, New York, NY (US)

(72) Inventor: Robert Francis MacInnis, Westport, CT (US)

(73) Assignee: AETHERSTORE INC., New York, NY (US)

( * ) Notice: Subject to any disclaimer, the term of this patent is extended or adjusted under 35 U.S.C. 154(b) by 0 days.

(21) Appl. No.: 13/840,017

(22) Filed: Mar. 15, 2013

(65) Prior Publication Data
US 2013/0304706 A1    Nov. 14, 2013

Related U.S. Application Data

(60) Provisional application No. 61/645,505, filed on May 10, 2012, provisional application No. 61/645,508, filed on May 10, 2012.

(51) Int. Cl.
  *G06F 17/30* (2006.01)
  *G06F 11/20* (2006.01)
  *G06F 11/14* (2006.01)

(52) U.S. Cl.
  CPC ..... *G06F 17/30578* (2013.01); *G06F 11/1464* (2013.01); *G06F 11/2094* (2013.01); *G06F 17/30194* (2013.01)

(58) Field of Classification Search
  CPC ................................. G06F 17/30575
  See application file for complete search history.

(56) References Cited

U.S. PATENT DOCUMENTS

| | | | | |
|---|---|---|---|---|
| 5,765,171 A | * | 6/1998 | Gehani | G06F 17/30575 |
| 6,098,078 A | * | 8/2000 | Gehani | G06F 17/30575 |
| | | | | 707/610 |
| 2002/0138362 A1 | | 9/2002 | Kitze et al. | |

(Continued)

FOREIGN PATENT DOCUMENTS

WO    WO 2010/088437 A2    8/2010

OTHER PUBLICATIONS

International Search Report and Written Opinion for PCT/US2013/040299, dated Dec. 2, 2013.

(Continued)

*Primary Examiner* — Mohammad S Rostami
(74) *Attorney, Agent, or Firm* — Baker Botts L.L.P.

(57) ABSTRACT

Techniques for distributed storage using a plurality of computing devices connected to a network can include storing an electronic file in a local storage layer of one of the computing devices. The stored electronic file can be asymmetrically transmitted, in portions, over the network to other computing devices to store the file across the other computing devices in a distributed storage layer. The electronic file can be asynchronously transmitted over the network to a cloud storage layer such that the electronic file is mirrored in the cloud storage layer. The local storage layer of each computing device can store, for each electronic file stored in the distributed storage layer, metadata having pointers to locations of the portions the electronic files stored in the local storage layer and distributed storage layer. The electronic files stored in the distributed storage layer can be displayed as stored in a single logical drive.

24 Claims, 7 Drawing Sheets

(56) References Cited

U.S. PATENT DOCUMENTS

| | | | |
|---|---|---|---|
| 2003/0028538 A1 | 2/2003 | Eikenbery | |
| 2004/0122917 A1 | 6/2004 | Menon et al. | |
| 2004/0133570 A1 | 7/2004 | Soltis | |
| 2006/0212931 A1* | 9/2006 | Shull | G06F 21/55 726/10 |
| 2006/0218160 A1* | 9/2006 | Bhatia | G06F 17/2211 |
| 2006/0230039 A1* | 10/2006 | Shull | H04L 63/08 |
| 2006/0230076 A1 | 10/2006 | Gounares et al. | |
| 2010/0082672 A1 | 4/2010 | Kottomtharayil et al. | |
| 2010/0131603 A1* | 5/2010 | Riemers | G06Q 10/107 709/206 |
| 2010/0199042 A1* | 8/2010 | Bates et al. | 711/114 |
| 2010/0332401 A1* | 12/2010 | Prahlad et al. | 705/80 |
| 2010/0332454 A1 | 12/2010 | Prahlad et al. | |
| 2011/0107103 A1* | 5/2011 | Dehaan et al. | 713/171 |
| 2011/0179162 A1* | 7/2011 | Mayo et al. | 709/224 |
| 2011/0179415 A1* | 7/2011 | Donnellan et al. | 718/1 |
| 2011/0302312 A1* | 12/2011 | McCrory | 709/226 |
| 2011/0320469 A1* | 12/2011 | Canessa et al. | 707/758 |
| 2012/0258777 A1* | 10/2012 | Huang | 455/557 |
| 2012/0303740 A1* | 11/2012 | Ferris | 709/217 |
| 2013/0110779 A1* | 5/2013 | Taylor et al. | 707/624 |

OTHER PUBLICATIONS

Supplementary European Search Report dated Jul. 5, 2016 in EP Application No. 13787573.
Dirk Neumann et al;STACEE:Enhancing Storage Clouds Using Edge Devices;pp. 19-26;Jun. 14, 2011;ACM.†

\* cited by examiner
† cited by third party

SYSTEMS AND METHODS FOR DISTRIBUTED STORAGE

CROSS-REFERENCE TO RELATED APPLICATIONS

This application is related to U.S. Provisional Application Ser. No. 61/645,505, filed on May 10, 2012, and U.S. Provisional Application Ser. No. 61/645,508, filed on May 10, 2012, which is each incorporated herein by reference in its entirety and from which priority is claimed.

BACKGROUND

The disclosed subject matter relates to techniques for distributed storage, including a local storage layer, a distributed storage layer, and a cloud storage layer.

Certain conventional secure data storage solutions can be difficult to use and difficult to maintain. IT hardware and staff can be expensive and fail regularly, and such failures can result in the loss of data. In connection with certain data storage solutions, data can be difficult or impossible to access remotely.

Conventional data storage products can be categorized into "Local Storage," "Network Storage Servers," "Web-Based Storage Services," and "Distributed Storage Systems." Each category can have relative benefits and drawbacks with regard to providing reliable, scalable, secure and fault-tolerant storage for small- to medium-sized office environments. Local hard disk drives in desktop computers are a common place to store a file. Local storage can provide high performance read/write times and a sense of tangible security, but if a disk fails, is destroyed, or data is accidentally or maliciously overwritten, the data no longer exists. Moreover, when hard drives fill up, users may attempt to manually manage storage space, deleting files or attempting to transfer them to another machine—a process requiring both time and expertise. Manually sharing files with colleagues can create multiple incoherent versions and emailing files can be insecure.

Network storage servers can be used to provide shared storage space for users in an organization. Commercially available network storage servers range from low- to mid-range 'box in the closet' approaches (called 'Network Attached Storage' or NAS) to high-end, fiber-channel Storage Area Networks (SANs) packed with blade servers and redundant disk arrays (e.g. RAID). Network storage servers can provide high-capacity storage for users to share, but nevertheless can suffer from a number of well-known problems of centralized storage: servers can be broken, tampered with, hacked, and stolen; they can be destroyed in a fire or ruined by coffee; users can still over-write or delete files by accident, and all data is saved in the same way as on a desktop's hard-drive.

While certain techniques are known for ameliorating these problems, including replicating data in a remote location, utilizing redundant disk arrays, and encryption, such techniques can still include various drawbacks, including increased locations from which unauthorized access may occur, increased expense and complication, and reduced speed and convenience. Additionally, although network storage servers provide file sharing and high-capacity storage, they can be expensive to maintain and administer.

Web-based data storage services provide inexpensive means of backing up and storing data over the internet. Services like Amazon S3, Apple iDisk, EMC Mozy, and Pro SoftNet iDrive are examples of such services. Some users may, however, be wary of routinely sending their sensitive information over the Internet, for example due to perceived weaker protection from digital search and seizure for data stored with a third party. While web-based storage can generally serve as a reliable backup service, it can require a constant, fast internet connection, and can be too slow to be considered a realistic alternative for day-to-day file access and storage.

Distributed storage techniques can include storing a file multiple times on multiple machines will spread the burden and the risk of data storage: the more copies of a file exist the less likely it is to be lost. More copies, however, means more places to steal from, so encryption systems can be required for sensitive data or environments. Moreover, certain existing distributed storage systems can provide low levels of reliability and performance.

Accordingly, there is a need for enhanced techniques for distributed storage.

SUMMARY

The disclosed subject matter relates to techniques for distributed storage, including a local storage layer, a distributed storage layer, and a cloud storage layer. Additionally, the disclosed subject matter relates to techniques for distributed storage with transparent backup and security of data with world-wide access and fully auditable version history.

In one aspect of the disclosed subject matter, a method for distributed storage using a plurality of computing devices communicatively coupled via a network includes storing an electronic file in a local storage layer of one of the computing devices. The electronic file can be asynchronously transmitted, in portions, over the network, to others of the plurality of computing devices such that the electronic file is stored across the other computing devices in the distributed storage layer. The electronic file can be asynchronously transmitted over the network to a cloud storage layer such that the electronic file is mirrored in the cloud storage layer. Metadata for each electronic file can be stored in the local storage layer of each computing device. The meta data can include pointers to locations of the portions of the electronic files stored in the local storage layer and distributed storage layer. The electronic files stored in the distributed storage layer can be displayed as though stored in a single logical drive.

In accordance with exemplary embodiments, asynchronously transmitting the electronic file stored in the local storage layer with a computing device can include partitioning the electronic file into fixed or variable sized portions, hashing the portions onto the storage devices of the other computing devices via the network, updating the metadata to include pointers to the hashed portions locations, and transmitting the metadata to the other computing devices via a gossip protocol. The hashed portions can be replicated onto one or more other computing devices through further hashing.

In an exemplary embodiment, an edited version of the electronic file can be stored by a computing device. The computing device can compare the edited version of the file with the original electronic file to generate fixed or variable sized edited portions. The edited portions can be hashed onto the storage devices of the other computing devices via the network, and the metadata can be updated to include, for the edited version of the file, pointers to the unchanged portions of the original file and pointers to the edited portions locations.

The method can further include retrieving the electronic file by one of the computing devices. The computing device can determine the locations of the portions of the electronic file from locally stored metadata. The portions can be retrieved from the locations via the network, and the retrieved portions can be assembled and stored in the local storage layer of the computing device. In accordance with an exemplary embodiment, the metadata can also include one or more of version information, access information, permission information, and logical drive path information for the electronic files stored in the distributed system. In certain embodiments, the electronic file can be encrypted.

In accordance with another aspect of the disclosed subject matter, a system for distributed storage can include a local storage layer for each of a plurality of computing devices and a distributed storage layer. The computing devices can be communicatively coupled with a network, and each can have associated therewith one or more processors and one or more storage devices, adapted for performing the techniques disclosed herein. In an exemplary embodiment, the computing devices can include one or more desktop computers, laptop computers, or handheld computing devices. The network can be a wired or wireless local area network, intranet, or the internet.

In another aspect of the disclosed subject matter, the techniques disclosed herein can be embodied as a non-transitory computer readable medium storing executable code, which when executed can cause one or more processors to perform the functions disclosed herein. Alternatively, all or portions of the methods disclosed herein can be embodied in hard-wired circuitry, alone or in connection with executable code.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

Figure 1A:
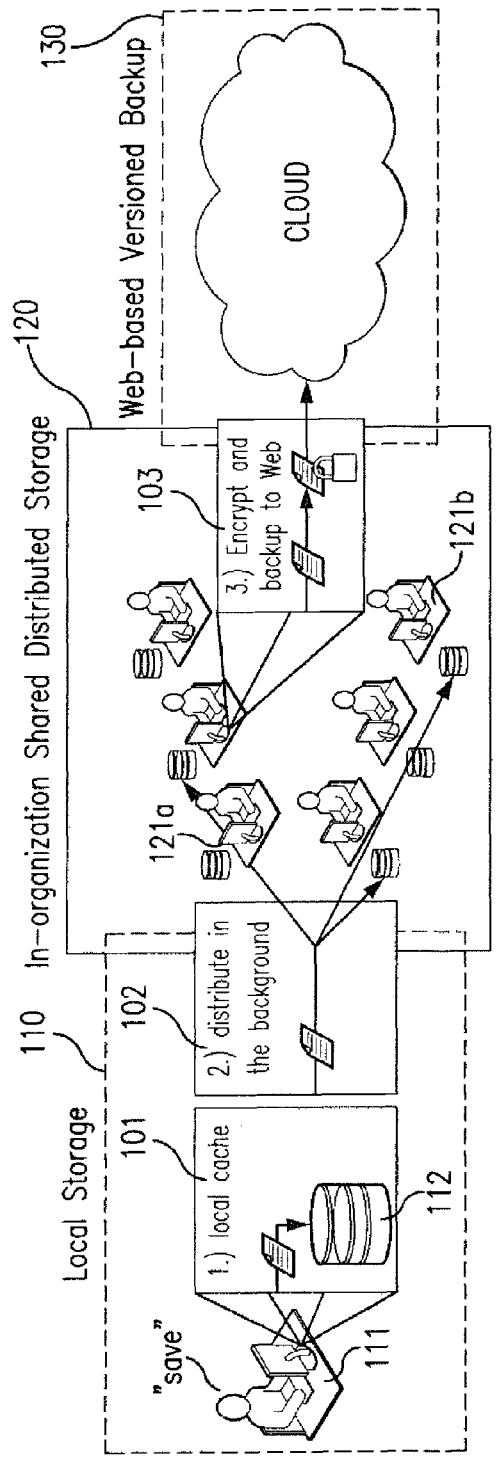
FIG. 1A is a flow diagram of a method for distributed storage in accordance with an exemplary embodiment of the disclosed subject matter.

Throughout the drawings, the same reference numerals and characters, unless otherwise stated or indicated by context, are used to denote like features, elements, components or portions of the illustrated embodiments. Moreover, while the disclosed subject matter will now be described in detail with reference to the Figures, it is done so in connection with the illustrative embodiments, which are intended to be non-limiting.

DETAILED DESCRIPTION

An exemplary storage system in accordance with the disclosed subject matter can include three storage "layers." The three storage layers can include a local storage layer for each computing device connected to the system, a distributed storage layer across the computing devices, and a cloud storage layer. The storage system can pool together un-used capacity in the computing device, and can support versioning, remote access, and long-term backup.

Exemplary embodiments of the disclosed subject matter are described below, with reference to FIGS. 1-6, for purposes of illustration, and not limitation. For purposes of clarity, the method and the system are described concurrently and in conjunction with each other, wherein reference numbers to the method will be made with parenthesis ( ), and reference to the system of will be made without parenthesis.

Figure 1B:
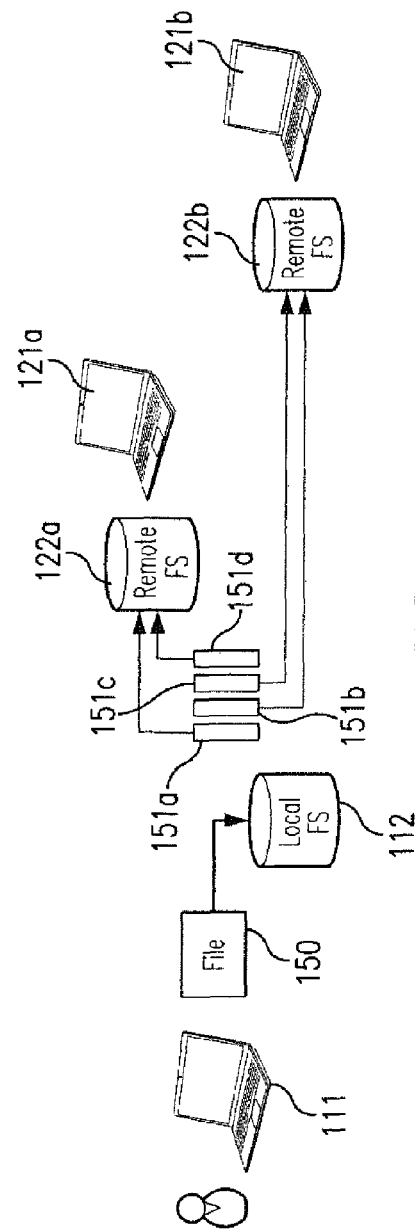
FIG. 1B is a schematic diagram of a system for distributed storage in accordance with an exemplary embodiment of the disclosed subject matter.

With reference to FIG. 1A and FIG. 1B, and in accordance with an exemplary embodiment of the disclosed subject matter, techniques for distributed storage can include the use of a plurality of computing devices (e.g., 111, 121*a* and 121*b* [collectively, 121]) communicatively coupled via a network. The computing devices 121 can be, for example, one or more desktop computers, laptop computers, handheld computing devices, or any other suitable computing device. The network can be a wired or wireless local area network, intranet, or the internet. For example, the computing devices 121 can be a number of machines in an office environment, including without limitation schools, hospitals, or other environments that will be readily apparent to one of ordinary skill in the art, connected to a local area network. Each computing device can have one or more processors and one or more storage devices, such one or more local hard drives, and can have software, including for example an operating system (e.g., Microsoft Windows, Mac OS, Linux, etc) and accompanying software applications.

Users of the computing devices 121 can save and retrieve files in accordance with the techniques disclosed herein. For example, when a user operating computing device 111 desires to save an electronic file 150, the electronic file 150 can be first stored (101) in a local storage layer 110 of one of the computing device 111. The local storage layer 110 can be, for example, a portion of the one or more storage devices 112, such as a local hard drive, associated with the computing device 111. Local storage can allow for fast and efficient read/write access to the file by the user who saves it.

As previously noted, merely storing a file in local storage 112 can include a number of drawbacks. Accordingly, the electronic file 150 can be asynchronously transmitted (102), in portions (e.g., 151a, 151b, 151c, and 151d [collectively, 151]), over the network, to others of the plurality of computing devices (e.g., 121a and 121b) such that the electronic file 150 is stored across the other computing devices 121 in a distributed storage layer 120. The distributed storage layer 120 (which can also be referred to, for example, as the intermediate storage layer) can include distributed storage across a plurality of machines connected via a wide area network, local area network, or the like. Each machine can be configured for distributed storage across other machines. For example, software can be installed on each machine which when executed allows the machine to engage in communication with the other machines such that a particular file can be stored over a plurality of the machines on a local area network.

The electronic file 150 can further be asynchronously transmitted (103) over the network to a cloud storage layer 130 such that the electronic file 150 is mirrored in the cloud storage layer 130. Such transmission can include first encrypting the data corresponding to the file 150 prior to transmission. Metadata, as described in more detail below, for each electronic file can be stored in the local storage layer 110 of each computing device 121. The metadata can include pointers to locations of the portions of the electronic files stored in the local storage layer and distributed storage layer.

In accordance with exemplary embodiments, asynchronously transmitting the electronic file 150 stored in the local storage layer 110 from a computing device 111 to the distributed storage layer 120 can include partitioning the electronic file 150 into portions 151 and storing the portions 151 across the other computing devices 121. The portions 151 can be fixed or variable size portions. For example, creating the portions 151, which can be referred to as "chunking," can include breaking the data of the electronic file 150 into fixed size chunks (e.g., and without limitation, between 4 Kb and 8 Kb in size). Alternatively, the electronic file 150 can be chunked into variable-sized chunks using, for example, a sliding window technique. Generally, for purpose of illustration and not limitation, the sliding window technique can include "moving" chunks up or down a file up to a certain point within a predefined "sliding window" in an attempt to find a common chunk. Such sliding can create gaps which can be filled by new chunks. One of ordinary skill in the art will appreciate that a variety of other suitable variations and techniques for partitioning the electronic file 150 into portions 151 can also be used, and that the disclosed subject matter is not intended to be limited to the exemplary embodiments disclosed herein.

The portions 151 can be hashed onto the storage devices (e.g., 122a and 122b [collectively, 122]) of the other computing devices 121 via the network. For example, each chunk can be hashed (e.g., with the SHA-1 algorithm or the like), producing a value (often referred to as a key) which can identify the position of a chunk in a keyspace. That is, for example, and as described in more detail below, to retrieve a file (i.e., to retrieve at least one chunk), the hash value can identify where the chunk can be found. Additionally, if a chunk has an identical value as another chunk, its hash value will be the same, and thus identical data need not be duplicated. The hashed portions 151 can then be transmitted, via the network, to other computing devices 121. For example, portions 151a and 151d can be transmitted to computing device 121a and stored in one or more storage devices 122a associated with computing device 121a. Portions 151b and 151c can be transmitted to computing device 121b and stored in one or more storage devices 122b associated with storage device 121b.

The metadata stored on each computing device (e.g., 111, 121a and 121b) can then be updated to include pointers to the hashed portions' 151 locations. For example, computing device 111 can hash the portions 151 and update metadata stored locally, and can transmit the metadata to the other computing devices via the network, using, e.g., a gossip protocol. In accordance with certain embodiments of the disclosed subject matter, the hashed portions 151 can be replicated onto one or more other computing devices through further hashing to create redundancies.

In an exemplary and non-limiting embodiment, hashing the portions 151 onto the storage devices (e.g., 122a and 122b [collectively, 122]) of the other computing devices 121 via the network can be accomplished using a distributed hash table implementation such as Chord. For purpose of illustration, and not limitation, each computing device (e.g., 121) can be a Chord node, where each Chord node is responsible for some portion of a keyspace. When electronic file 150 is stored in the distributed storage layer 120, it is broken up into portions ("chunks" or "blocks") 151 and each of these chunks is hashed, producing a value which identifies each chunk's position in the keyspace, and thus each computing device instance on which each chunk will be stored. That is, for example, to retrieve data a computing device only needs to know of a file's (or chunk's) hash value, which identifies where the data can be found. Such techniques can obviate central co-ordination or data placement heuristics.

Figure 2A:
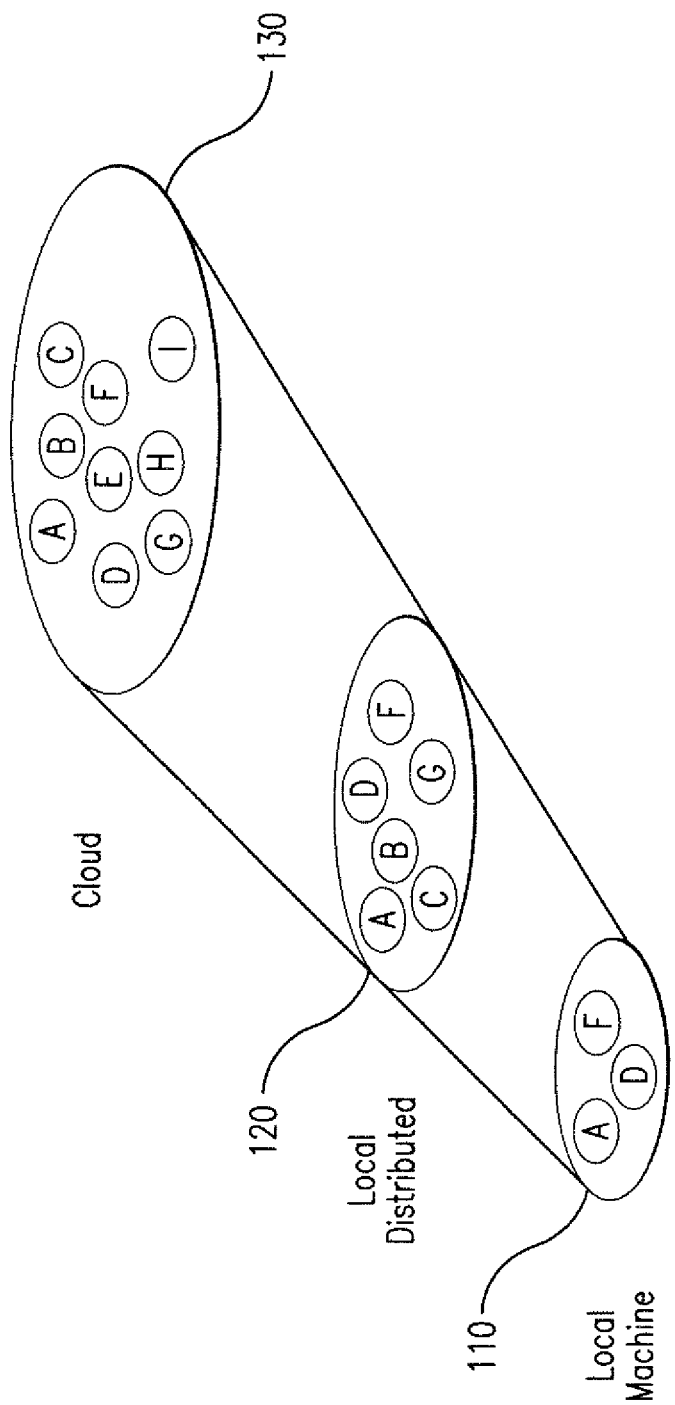
FIG. 2A is a schematic diagram of storage layers in accordance with an exemplary embodiment of the disclosed subject matter.

As noted above, the electronic file 150 can further be asynchronously transmitted over the network to a cloud storage layer 130 such that the electronic file 150 is mirrored in the cloud storage layer 130. In accordance with an exemplary embodiment, with reference to FIG. 2A and FIG. 2B, the cloud storage layer 130 can include the entire dataset stored in the system. The cloud storage layer 130 can serve as a redundancy for the local layer 110 and distributed layer 120, and additionally or alternatively as a repository for data that exceeds the capacity of the local layers 110 and distributed layer 120. For example, as illustrated in FIG. 2A, where the system includes file portions A-I, the local storage layer 110 of one computing device can store, for example, file portions A, D, and F, the distributed storage layer 120 can store file portions A, B, C, D, G, and F, and the cloud storage layer can store all file portions A-I.

In an exemplary embodiment, data can be written to the cloud storage layer 130 in a manner similar to the techniques disclosed herein for asynchronously transmitting an electronic file from a local storage layer to the distributed storage layer. That is, a file can be divided into a series of portions or "chunks" which can be transmitted to the cloud storage layer 130. The cloud storage layer 130 can include any suitable storage service, which can include one or more storage devices, processors, and/or software operable to store and provide access to electronic data over a network such as the internet. For example, the cloud storage layer 130 can include commercially available web storage services such as Amazon S3, Apple iDisk, EMC Mozy, and Pro SoftNet iDrive. One of ordinary skill in the art will appreciate that a variety of other suitable cloud storage services can be used, and the disclosed subject matter is not intended to be limited to the examples disclosed herein. For example, the cloud storage layer 130 need not be commercially available, but may instead include a proprietary cloud storage system.

Figure 2B:
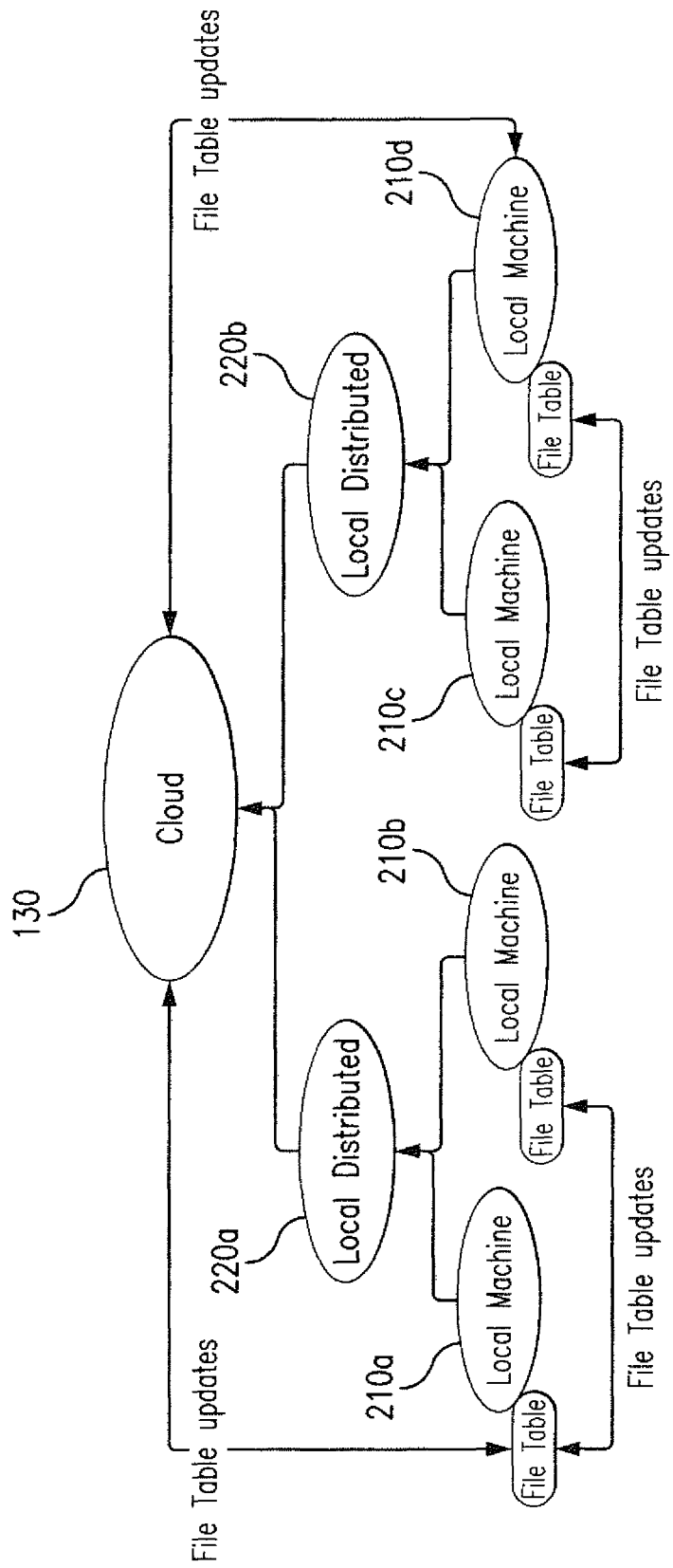
FIG. 2B is a diagram illustrating the hierarchy of storage layering in accordance with an exemplary embodiment of the disclosed subject matter.
Figure 3:
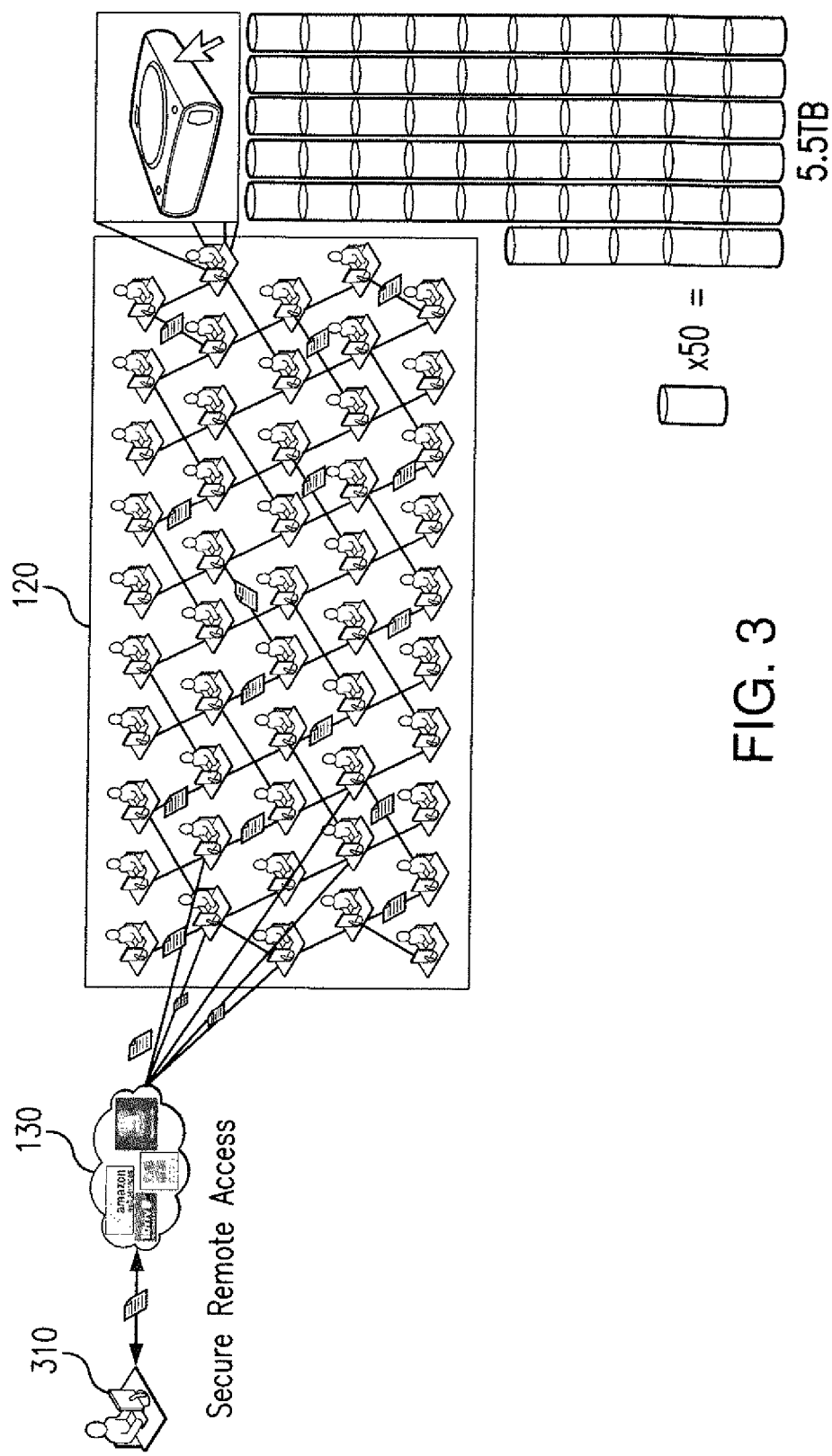
FIG. 3 is a schematic diagram illustrating remote access to a distributed storage system in accordance with an exemplary embodiment of the disclosed subject matter.

In accordance with an exemplary embodiment, the cloud storage layer 130 can include files from a plurality of distributed storage layers, as illustrated in FIG. 2B. For example, a company may operate a local area network in two locations, where the computers on each network run the system described herein. While each network can have individual distributed storage layers (220*a* and 220*b*), both layers can be included in the cloud storage layer 130. For example, the local area network corresponding to distributed storage layer 220*a* can include two computing devices 210*a* and 210*b*, which can store electronic files in corresponding local storage layers or in distributed storage layer 210*a*. Likewise, the local area network corresponding to distributed storage layer 220*b* can include two computing devices 210*c* and 210*d*, which can store electronic files in corresponding local storage layers or in distributed storage layer 220*b*. The electronic files can be written to the cloud storage layer 130 from the computing devices (e.g., 210*a*, 210*b*, 210*c*, or 210*d*) on which a file was created or edited, or alternatively the file portions can be written from the distributed storage layers 220*a* or 220*b*.

In an exemplary embodiment, the volume of the local storage layer 110 can be limited. For example, the system can be configured such that a given machine will dedicate 1 GB of data to the system. In some embodiments, the local storage layer 110 can act as a cache. For example, a file may be reallocated from local storage after a predetermined lapse in time. Additionally or alternatively, files may be removed from local storage 110 according to a heuristic model. The distributed storage layer 120 can likewise act as a cache to the cloud storage layer 130. For example, and as previously noted, an electronic file can be asynchronously sent to local distributed storage 110, where data can be stored using, e.g., Chord to determine placement. Data sent to the distributed layer 110 storage can be replicated, so that it remains available despite the failure of n−1 machines containing the data, where data is replicated n times. The operation to store in the distributed storage layer 120 can be executed asynchronously, so the user or application storing file data need not wait for the distributed storage operation to complete. In some cases the capacity of the distributed storage layer 120 can be less than the total amount of data in storage system, in which case the distributed storage layer 120 can act as a cache to the cloud storage layer 130. The cloud storage layer 130 can store the entire dataset that is stored in the storage system. Updates can be written to the cloud store asynchronously, and in certain embodiments can also be queued before being sent. Queuing can allow the system to upload a series of short updates as a single unit, rather than repeatedly sending new updates as they happen.

The cloud storage layer 130 can additionally provide remote access to the system, for example through the internet from a location away from a local area network on which the system is installed. For example, with reference to FIG. 3, a remote computing device 310 can access an electronic file stored on the cloud storage layer 130. The remote computing device 310 can thus access files mirrored from the distributed storage layer 120 via the cloud storage layer 130.

As embodied herein, the local storage layer 110 of each computing device in a distributed storage layer 120 can store metadata related to the electronic files stored in the distributed storage layer 120 and the local storage layer 110. In accordance with an exemplary embodiment, and with reference to FIG. 4, the metadata can include, for each electronic file stored (e.g., file 150), version information 420, access information, permission information, and logical drive path information 410.

Figure 4:
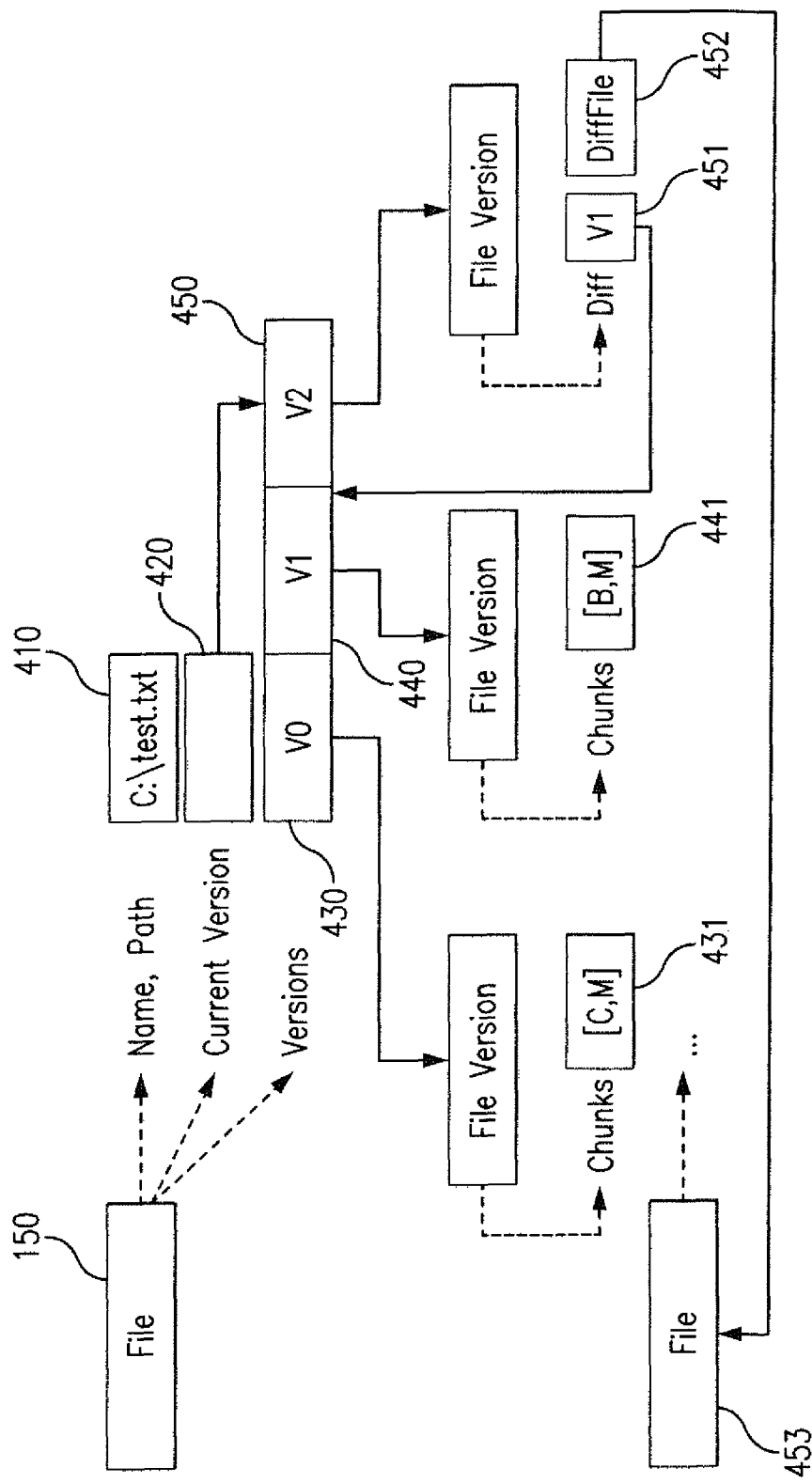
FIG. 4 is a diagram of a metadata file in accordance with an exemplary embodiment of the disclosed subject matter.
Figure 6:
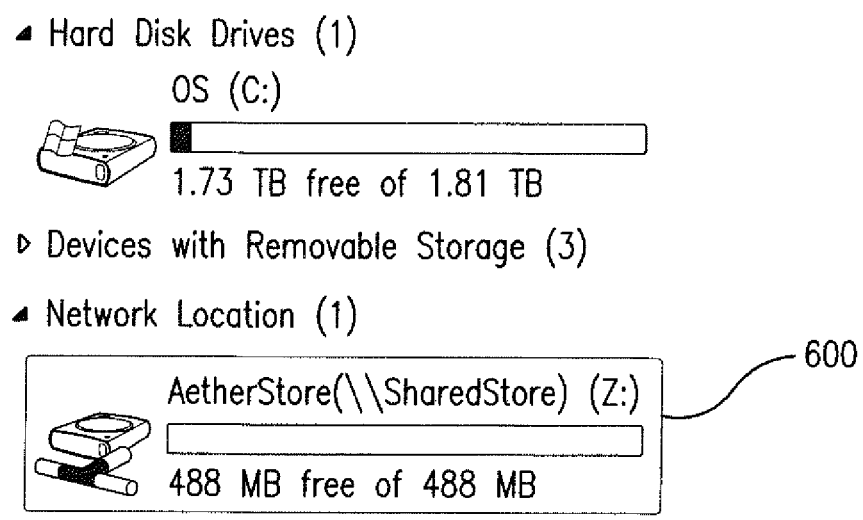
FIG. 6 depicts the display of a single logical networked drive in accordance with an exemplary embodiment of the disclosed subject matter.

For purpose of illustration, and not limitation, FIG. 4 depicts the metadata for a file, named "test.txt" having three versions: V0 430, V1 440, and V2, 450. As illustrated by FIG. 4, the logical drive path information 410 can include a string representative of how the file 150 will be displayed to a user. For example, the file 150 name and path can be displayed as "C:\test.txt." The files, including file 150, can be displayed as though stored in a single logical drive, as depicted in FIG. 6 for purpose of illustration and not limitation. That is, each computing device can be configured to display files stored in the distributed storage layer as if they were stored in a single logical drive 600.

Version V0 430 and version V1 440 can be stored as full files, and version V2 450 can be stored as a diff to be compared against the previous version, V1 440, as described in more detail below. That is, version V0 430 can include access information including pointers 431 to the location of the hashed portions of the version V0 of file 150. Likewise, version V1 440 can include access information including pointers 441 to the location of the hashed portions of version V1 the file 150. To retrieve version V0 430 or version V1 440, these pointers can be resolved and a computing device can request the portions needed to create a local copy of the file version. Version V2 450 can include access information including a pointer 451 to the previous version V1 440 and a pointer 452 to a diff file 453. To retrieve version V2 450, these pointers can be resolved and a computing device can request the portions of V1 441 and the diff file 453 to create a local copy of version V2 450 of the file 150.

When stored locally, the metadata corresponding to the file 150 stored locally can include a pointer to the location of the file on local storage. For example, retrieving the electronic file 150 at one of the plurality of computing devices can include determining the locations (e.g., using pointers 431, 441, or 451 and 452) of portions of the electronic file 150 from the metadata. The portions can then be retrieved from those locations, via the network and assembled and stored on the local storage layer of the computing device. The metadata on the computing device can then be updated to include pointers to the locally stored portions rather than the portions stored on the distributed storage layer.

Figure 5A:
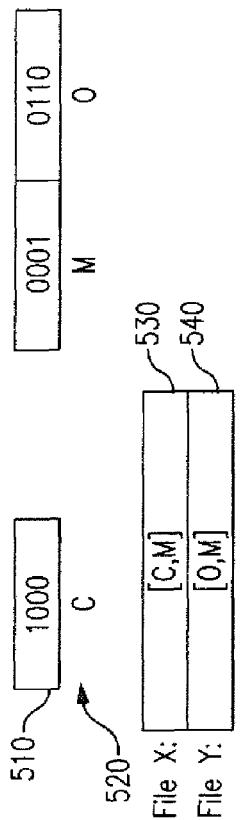
FIG. 5A is a diagram of hashed portions of electronic files in accordance with an exemplary embodiment of the disclosed subject matter.
Figure 5B:
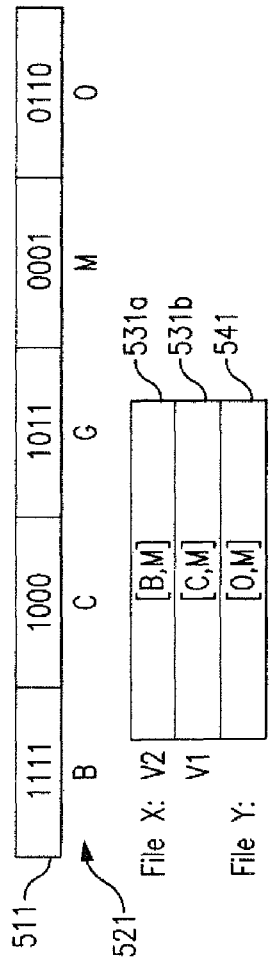
FIG. 5B is a diagram illustrating hashed portions of an edited electronic file in accordance with an exemplary embodiment of the disclosed subject matter.
Figure 5C:
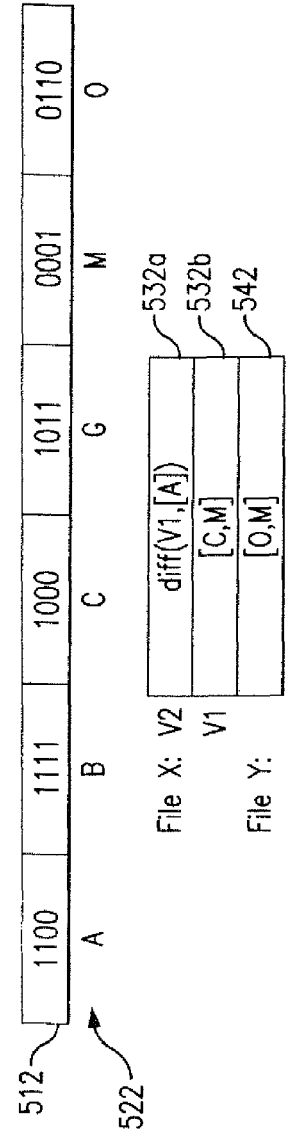
FIG. 5C is a diagram illustrating hashed portions of an edited electronic file in accordance with another exemplary embodiment of the disclosed subject matter.

For purpose of illustration, and not limitation, FIGS. 5A, 5B, and 5C illustrate exemplary hashed file portions (chunks) in connection with stored metadata in accordance with the disclosed subject matter. FIG. 5A depicts an example where three portions 510 are stored in the distributed storage layer of the system described herein. The three portions include portions corresponding to two files, File X 530 and File Y 540. Each portion can be hashed 520 as disclosed herein to generate hashes corresponding to the file portions (C, M and O). File X 530 can be requested by issuing a look-up call for portions C and M. File Y 540 can include some overlap with File X 530, and thus can be requested by issuing a look-up call for portions O and M. Because File X 530 and File Y 540 share portions M, block M need not be stored twice.

As previously noted herein, edits or updates to a file can be stored either by creating a diff file, which allows the new version of the file to be computed from the previous version, or by storing an entirely new version of the file. FIG. 5B depicts an exemplary edit to File X 530 by creating a new version of the file. In this exemplary scenario, five portions 511 can be stored in the distributed storage layer and hashed (B, C, G, M, O) 521 in accordance with the techniques disclosed herein. These portions 511 can include portions corresponding to two files, File X and File Y 541, where File X has two versions 531a and 531b. Version V1 531b and Version V2 531a of File X can be requested by issuing a look-up call for portions C and M and portions B and M, respectively. That is, for example, version V2 531a of File X can include an edit corresponding only to one of the file portions of version V1 531b (e.g., portion C of version V1 531b). In like manner, File Y 541 can include some overlap with File X, such that both files include portions M.

FIG. 5C depicts an exemplary edit to File X 530 by creating a diff file based on the previous version. In such a scenario, the diff can be computed and stored in one or more new portions. Six portions 512 can be stored in the distributed storage layer and hashed (A, B, C, G, M, O) 522 as disclosed herein. File X can include two versions 532a and 532b. Version V1 532b of File X can be requested by issuing a look-up call for portions C and M as previously described. However, an edit to File X to create version V2 532a can include storing portion A, which can be representative of the changes relative to version V1 532b. That is, for example, version V2 531a of File X can be requested by issuing a look-up call for the portions of version V1 531b in addition to issuing a look-up call for portion A. The requesting computing device can then perform an operation on the requested blocks to assemble version V2 531a on the local storage layer. In accordance with the disclosed subject matter, edits to a file can be stored using either a new version or a diff file based on the magnitude of changes made to the file. Additionally, when a large number of diffs have been performed, the diffs can be combined into a single version to improve the speed of lookup operations.

In an exemplary embodiment, the volume of the local storage layer can be limited. For example, the system can be configured such that a given machine will dedicate 1 GB of data to the system. In some embodiments, the local storage layer can act as a cache. For example, a file may be reallocated from local storage after a predetermined lapse in time. Additionally or alternatively, files may be removed from local storage according to a heuristic. For purpose of illustration, and not limitation, if a machine has a large capacity it can control a larger portion of the keyspace than a node with small capacity. For example, a computing device with large capacity can be assigned multiple logical nodes, giving it a greater portion of the keyspace. However, such a configuration can involve the hashing of file portions onto different logical nodes on the same physical machine. Accordingly, the assignment of a node to a portion of the keyspace can be made such that logical nodes on the same machine occupy consecutive portions of the keyspace.

In certain circumstances the techniques disclosed herein can lead to conflicting updates or edits (e.g., concurrent update or creation of the same file, concurrent renaming of the same file, or the deletion of a file just as a copy is updated). In such scenarios, and in accordance with the disclosed subject matter, a "winning" update can be propagated to the other computing devices based on the timestamp of the update, or if the timestamps of the competing updates are the same, based on an identification of the computing device. The "losing" update can be preserved in a new file added to the system, which can be given a name based on the original file. A conflict file can be created for conflicting updates and the metadata stored on each computing device can be updated to reference the new file for the "losing" update.

During initialization, each computing device can join the system using a discovery service. For example, a computing device can announce its presence on the network upon initialization. Each computing device can also run a discovery thread which can monitor the network for new computing devices becoming active.

The techniques disclosed herein can provide a storage system that combines the strengths and mitigates the weaknesses of existing data storage solutions, including a storage system with the write speed of local storage and the shared storage space of networked storage servers. A distributed storage layer can pool together un-used capacity in existing office machines—capacity that would be wasted otherwise—and can spread both the load and the risk of data storage amongst them. A secure cloud storage layer can be used for versioning, remote access, and long-term backup. The techniques disclosed herein can provide full file version histories for auditing and compliance purposes without the need for IT staff, maintenance, and new hardware.

Moreover, the techniques disclosed herein can provide scalability and extensibility in that different policies can be made available for different organizational requirements. For example, policy for a law office may dictate the use of transient memory for the file cache, wiping any local copies the moment a machine is unplugged. It may also specify multiple Web-based backup facilities in multiple international jurisdictions to which only portions of the total backup are stored—each unusable on its own—thus reducing the threat of ECPA-like acts of digital search and seizure.

As described above in connection with certain embodiments, certain components, e.g., local storage layer 110, distributed storage layer 120, and cloud storage layer 130, can include a computer or computers, processor, network, mobile device, cluster, or other hardware to perform various functions. Moreover, certain elements of the disclosed subject matter can be embodied in computer readable code which can be stored on computer readable media and when executed cause a processor to perform certain functions. In these embodiments, the computer plays a significant role in permitting the system and method for distributed storage over a network, e.g., a local area network and/or the internet. For example, the presence of the computer, processor, memory, storage, and networking hardware provides for pooling of un-used capacity in the computing devices, and can provide support for versioning, remote access, and long-term backup.

Additionally, as described above in connection with certain embodiments, certain components can communicate with certain other components, for example via a network, e.g., the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A method for distributed storage using a plurality of computing devices communicatively coupled via a network, comprising:

storing an electronic file in a local storage layer of one of the plurality of computing devices;

asynchronously transmitting the electronic file stored in the local storage layer of one of the plurality of computing devices, in portions, over the network to others of the plurality of computing devices such that the electronic file is stored across the other computing devices in a distributed storage layer;

asynchronously transmitting the electronic file stored in the distributed storage layer over the network to a cloud storage layer such that the electronic file is mirrored in the cloud storage layer;

storing in the local storage layer of each of the plurality of computing devices, for each electronic file stored in the distributed storage layer, metadata having pointers to locations of the portions the electronic files stored in the local storage layer and distributed storage layer, wherein asynchronously transmitting the electronic file stored in the local storage layer of one of the plurality of computing devices includes:
  partitioning the electronic file into fixed or variable sized portions;
  hashing the portions onto the storage devices of the other computing devices, via the network;
  updating the metadata to include pointers to the hashed portions' locations; and
  transmitting, via the network, the metadata to the other computing devices using a gossip protocol; and storing and retrieving an edited version of the electronic file, wherein storing includes, at one of the plurality of computing devices:
  comparing the edited version with the electronic file to generate a diff file, the diff file containing differences between the edited version and the electronic file;
  partitioning the diff file into fixed or variable sized portions;
  hashing the portions of the diff file onto the storage devices of the other computing devices, via the network;
  updating the metadata to include pointers to the locations of the hashed portions of the diff file;
  transmitting, via the network, the metadata to the other computing devices using a gossip protocol, and wherein retrieving the edited version at one of the plurality of computing devices, comprises:
  determining locations of portions of the electronic file and portions of the diff file from the metadata;
  retrieving the portions of the electronic file and the diff file from said locations, via the network; and
  assembling the edited version based on the retrieved portions of the electronic file and the diff file on the local storage layer.

2. The method of claim 1, further comprising displaying, with a display device coupled with one of the computing devices, the electronic files stored in the distributed storage layer as stored in a single logical drive.

3. The method of claim 1, wherein the plurality of computing devices include one or more of a desktop computer, a laptop computer, or a handheld computing device.

4. The method of claim 1, wherein the network includes one or more of a wired local area network, a wireless local area network, an intranet, or the internet.

5. The method of claim 1, further comprising replicating the hashed portions onto one or more other computing devices through further hashing.

6. The method of claim 1, further comprising remotely accessing the electronic file, wherein remotely accessing includes, at a remote computing device retrieving the electronic file from the cloud storage layer.

7. The method of claim 1, wherein the metadata further includes one or more of version information, access information, permission information, and logical drive path information about the electronic file.

8. The method of claim 1, further comprising encrypting the electronic file.

9. A non-transitory computer-readable medium containing computer-executable instructions that when executed cause one or more computer devices to perform a method for distributed storage using a plurality of computing devices communicatively coupled via a network, comprising:
  storing an electronic file in a local storage layer of one of the plurality of computing devices;
  asynchronously transmitting the electronic file stored in the local storage layer of one of the plurality of computing devices, in portions, over the network to others of the plurality of computing devices such that the electronic file is stored across the other computing devices in a distributed storage layer;
  asynchronously transmitting the electronic file stored in the distributed storage layer over the network to a cloud storage layer such that the electronic file is mirrored in the cloud storage layer;
  storing in the local storage layer of each of the plurality of computing devices, for each electronic file stored in the distributed storage layer, metadata having pointers to locations of the portions the electronic files stored in the local storage layer and distributed storage layer,
  wherein asynchronously transmitting the electronic file stored in the local storage layer of one of the plurality of computing devices includes:
    partitioning the electronic file into fixed or variable sized portions;
    hashing the portions onto the storage devices of the other computing devices, via the network;
    updating the metadata to include pointers to the hashed portions' locations; and
    transmitting, via the network, the metadata to the other computing devices using a gossip protocol; and
  storing and retrieving an edited version of the electronic file, wherein storing includes, at one of the plurality of computing devices:
    comparing the edited version with the electronic file to generate a diff file, the diff file containing differences between the edited version and the electronic file;
    partitioning the diff file into fixed or variable sized portions;
    hashing the portions of the diff file onto the storage devices of the other computing devices, via the network;
    updating the metadata to include pointers to the locations of the hashed portions of the diff file;
    transmitting, via the network, the metadata to the other computing devices using a gossip protocol, and
  wherein retrieving the edited version at one of the plurality of computing devices, comprises:
    determining locations of portions of the electronic file and portions of the diff file from the metadata;
    retrieving the portions of the electronic file and the diff file from said locations, via the network; and
    assembling the edited version based on the retrieved portions of the electronic file and the diff file on the local storage layer.

10. The non-transitory computer readable medium of claim 9, further comprising displaying, with a display device coupled with one of the computing devices, the electronic files stored in the distributed storage layer as stored in a single logical drive.

11. The non-transitory computer readable medium of claim 9, wherein the plurality of computing devices include one or more of a desktop computer, a laptop computer, or a handheld computing device.

12. The non-transitory computer readable medium of claim 9, wherein the network includes one or more of a wired local area network, a wireless local area network, an intranet, or the internet.

13. The non-transitory computer readable medium of claim 9, further comprising replicating the hashed portions onto one or more other computing devices through further hashing.

14. The non-transitory computer readable medium of claim 9, further comprising remotely accessing the electronic file, wherein remotely accessing includes, at a remote computing device retrieving the electronic file from the cloud storage layer.

15. The non-transitory computer readable medium of claim 9, wherein the metadata further includes one or more of version information, access information, permission information, and logical drive path information about the electronic file.

16. The non-transitory computer readable medium of claim 9, further comprising encrypting the electronic file.

17. A system for distributed storage, comprising:
a plurality of computing devices communicatively coupled with a network, each computing device having associated therewith one or more processors and one or more storage devices;
a distributed storage layer including a portion of the one or more storage devices of each of the plurality of computing devices;
a local storage layer defined on the one or more storage devices of each computing device having stored thereon metadata having pointers to locations of portions of electronic files stored in the local storage layer and distributed storage layer;
wherein the one or more processors of each computing device are configured to communicate, via the network, with others of the one or more computing devices such that portions of an electronic file stored in the local storage layer of a first computing device are asynchronously stored across the other computing devices in the distributed storage layer;
wherein the one or more processors of each computing device are configured to communicate, via the network, with a cloud storage layer such that the electronic file stored in the distributed storage layer is asynchronously mirrored in the cloud layer,
wherein the one or more processors of the first computing device are further configured to partition the electronic file into fixed or variable sized portions, hash the portions onto the storage devices of the other computing devices, via the network, update the metadata to include pointers to the hashed portions' locations, and transmit, via the network, the metadata to the other computing devices using a gossip protocol such that the portions of the electronic file are asynchronously stored across the other computing devices in the distributed storage layer, and
wherein the one or more processors of the first computing device are further configured to store an edited version of the electronic file, wherein said storing includes:
comparing the edited version with the electronic file to generate a diff file, the diff file containing differences between the edited version and the electronic file;
partitioning the diff file into fixed or variable sized portions;
hashing the portions of the diff file onto the storage devices of the other computing devices, via the network;
updating the metadata to include pointers to the locations of the hashed portions of the diff file;
transmitting, via the network, the metadata to the other computing devices using a gossip protocol; and
and wherein the one or more processors of a second computing device are configured to retrieve the edited version of the electronic file, wherein said retrieving the edited version comprises:
determining locations of portions of the electronic file and portions of the diff file from the metadata;
retrieving the portions of the electronic file and the diff file from said locations, via the network; and
assembling the edited version based on the retrieved portions of the electronic file and the diff file on the local storage layer.

18. The system of claim 17, wherein the one or more processors of each computing device are configured to display, with a display device coupled with one of the computing devices, the electronic files stored in the distributed storage layer as stored in a single logical drive.

19. The system of claim 17, wherein the plurality of computing devices include one or more of a desktop computer, a laptop computer, or a handheld computing device.

20. The system of claim 17, wherein the network includes one or more of a wired local area network, a wireless local area network, an intranet, or the internet.

21. The system of claim 17, wherein the one or more processors of each of the plurality of computing devices are further configured to replicate the hashed portions onto one or more other computing devices through further hashing.

22. The system of claim 17, further comprising a remote computing device having one or more processors configured to remotely access the electronic file by retrieving the electronic file from the cloud storage layer.

23. The system of claim 17, wherein the metadata further includes one or more of version information, access information, permission information, and logical drive path information about the electronic file.

24. The system of claim 17, wherein the one or more processors each of the plurality of computing devices is further configured to encrypt the electronic file.

* * * * *